United States Patent [19]
Greene

[11] Patent Number: 5,938,811
[45] Date of Patent: Aug. 17, 1999

[54] METHOD FOR ALTERING THE TEMPERATURE DEPENDENCE OF OPTICAL WAVEGUIDES DEVICES

[75] Inventor: Benjamin Irvin Greene, Westfield, N.J.

[73] Assignee: Lucent Technologies Inc., Murray Hill, N.J.

[21] Appl. No.: 08/862,557

[22] Filed: May 23, 1997

[51] Int. Cl.$^6$ .................................................. C03B 32/00
[52] U.S. Cl. ................................ 65/385; 65/394; 65/431; 65/426; 65/386
[58] Field of Search ............................ 65/394, 423, 430, 65/385, 426, 386, 431

[56] References Cited

U.S. PATENT DOCUMENTS

| | | | |
|---|---|---|---|
| 4,515,612 | 5/1985 | Burrus | 65/426 |
| 4,676,820 | 6/1987 | Le Sergent | 65/394 |
| 4,900,115 | 2/1990 | Heuring . | |

FOREIGN PATENT DOCUMENTS

| | | | |
|---|---|---|---|
| 3104041 | 8/1982 | Germany | 65/426 |
| 145924 | 4/1985 | Japan | 65/426 |

*Primary Examiner*—John Hoffmann

[57] ABSTRACT

In accordance with the invention glass waveguide devices are provided with enhanced temperature stability by incorporating within appropriate lengths of the waveguides a transparent compensating material having a refractive index variation with temperature that differs substantially from that of the waveguide. The compensating material can be a non-glass material, such as a liquid, driven into the glass by heat and pressure. In a preferred embodiment, $D_2O$ is incorporated into waveguides for optical communications. The $D_2O$ is transparent to the preferred communications wavelengths centered at about 1.55 $\mu$m and has a dn/dT opposite in polarity to the dn/dT of glass. The resulting structure exhibits enhanced temperature stability with reduced magnitude of dn/dT. The technique is particularly useful in devices based on interference between multiple waveguides, as it is not necessary to reduce dn/dT to zero in the respective waveguides. It suffices to compensate the differences. Such compensation can be achieved by compensating materials having dn/dT of either the same polarity as the dn/dT of the waveguides or the opposite polarity. Preferred embodiments include routers, Fourier filters and Bragg filters. In single waveguide devices such as gratings, compensating materials of opposite polarity can substantially enhance the temperature stability.

12 Claims, 4 Drawing Sheets

T(°C)
(NON-LINEAR)

T(°C)
(NON-LINEAR)

METHOD FOR ALTERING THE TEMPERATURE DEPENDENCE OF OPTICAL WAVEGUIDES DEVICES

FIELD OF THE INVENTION

This invention relates to methods for making optical waveguide devices and, in particular, to a method for making such devices having enhanced temperature stability.

BACKGROUND OF THE INVENTION

As optical communications systems are widely deployed, there is an increasing need for devices capable of combining, separating, switching, adding and dropping optical signals. For example, broadband optical multiplexers are needed for delivering voice and video signals to the home, for combining pump and communications signals in an optical amplifier, and for adding monitoring signals to optical fibers. Dense wavelength-division multiplexing (WDM) systems need multiplexers to combine and separate channels of different wavelengths and need add-drop filters to alter the traffic. Low speed optical switches are needed for network reconfiguration.

These important functions are typically performed by optical waveguide devices such as integrated optical silica waveguide circuits formed on planar silicon substrates. Such waveguides are typically formed by depositing base, core and cladding layers on a silicon substrate. The base layer can be made of undoped silica. It isolates the fundamental optical mode from the silicon substrate and thereby prevents optical loss at the silica substrate interface. The core layer is typically silica doped with phosphorus or germanium to increase its refractive index and thereby achieve optical confinement. The cladding is typically silica doped with both boron and phosphorus to facilitate fabrication and provide an index matching that of the base. Using well-known photolithographic techniques, the cores can be economically configured into a wide variety of compact configurations capable of performing useful functions. See, for example, Y. P. Li and C. H. Henry, "Silicon Optical Bench Waveguide Technology", Ch. 8, *Optical Fiber Telecommunications,* Vol. IIIB, p. 319–375 (Academic Press, 1997).

Other waveguide devices are made of optical fiber. Optical fibers typically comprise a higher index core, which can be doped silica, and a surrounding cladding of a lower index glass. A variety of all-fiber devices are made by providing one or more Bragg gratings in the fiber core. Such gratings are conventionally made by providing the core with a photosensitive dopant such as germanium and side-writing a grating using ultraviolet light.

One shortcoming of these optical waveguide devices is their sensitivity to temperature. Many waveguide devices are based upon optical interference between beams of light propagated down different paths. Depending on the phase relationship between the beams at the point of recombination, light will either be transmitted or reflected back. Spectrally narrow, high contrast resonances can be readily designed, enabling high performance wavelength division multiplexers and blocking filters. However variable ambient temperature has a perceptible and disadvantageous effect on the performance of such devices. The refractive index of the composite glass structure through which the light travels depends on temperature. Thus the spectral positions of critical resonances shift with temperature.

Similar problems occur in fiber waveguide devices. Bragg gratings, for example, are critically dependent on the path lengths between successive index perturbations. But these path lengths change due to the temperature dependence of the refractive index, shifting the operating wavelength of the gratings.

For many applications such variation is not acceptable, and the devices are placed in temperature compensating packages for stable operation. Such packaging is expensive and adds reliability problems. Accordingly there is a need for waveguide devices having enhanced temperature stability.

SUMMARY OF THE INVENTION

In accordance with the invention glass waveguide devices are provided with enhanced temperature stability by incorporating within appropriate lengths of the waveguides a transparent compensating material having a refractive index variation with temperature that differs substantially from that of the waveguide. The compensating material can be a non-glass material, such as a liquid, driven into the glass by heat and pressure. In a preferred embodiment, $D_2O$ is incorporated into waveguides for optical communications. The $D_2O$ is transparent to the preferred communications wavelengths centered at about 1.55 μm and has a dn/dT opposite in polarity to the dn/dT of glass. The resulting structure exhibits enhanced temperature stability with reduced magnitude of dn/dT.

The technique is particularly useful in devices based on interference between multiple waveguides, as it is not necessary to reduce dn/dT to zero in the respective waveguides. It suffices to compensate the differences. Such compensation can be achieved by compensating materials having dn/dT of either the same polarity as the dn/dT of the waveguides or the opposite polarity. Preferred embodiments include routers, Fourier filters and Bragg filters. In single waveguide devices such as gratings, compensating materials of opposite polarity can substantially enhance the temperature stability.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
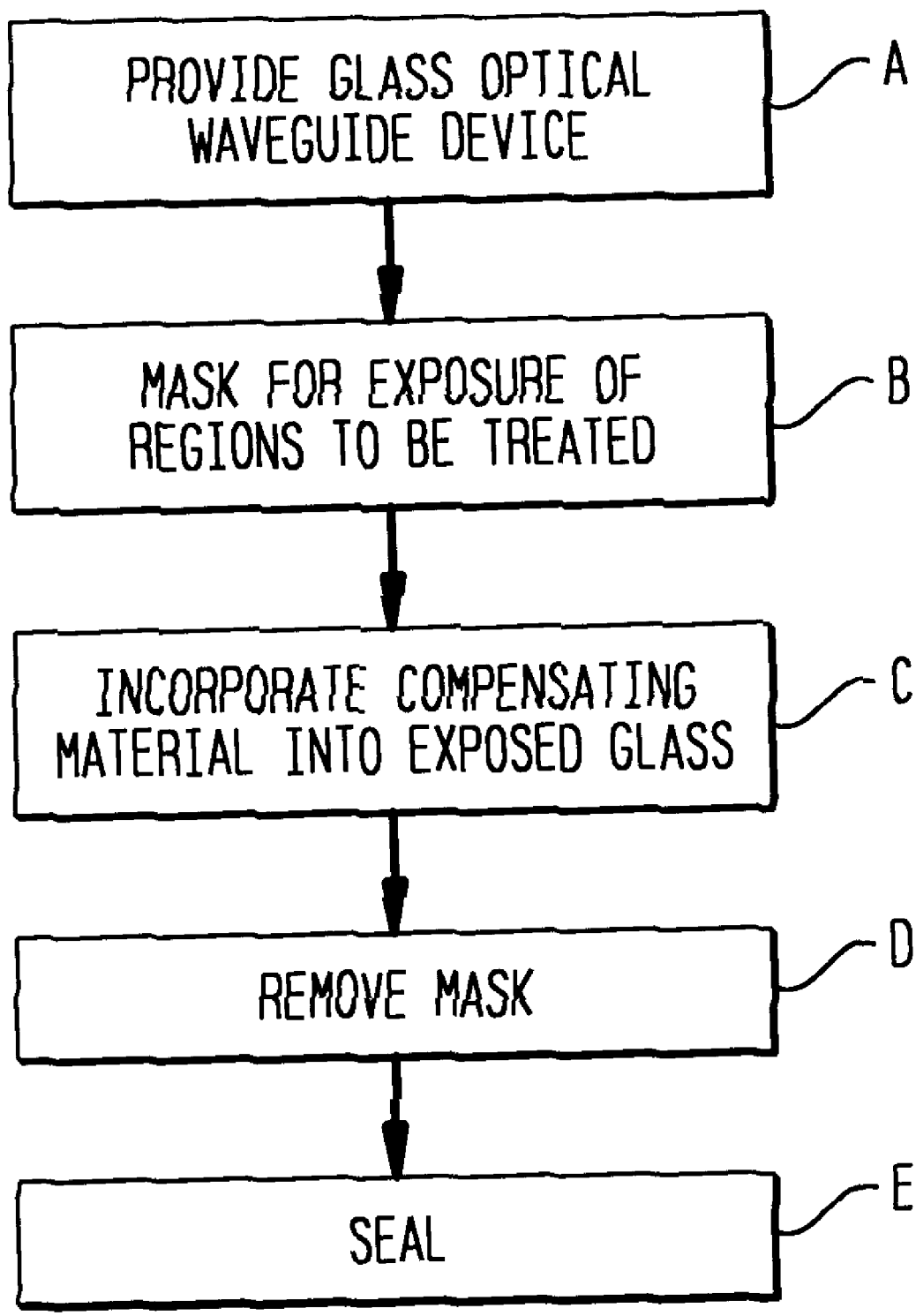
FIG. 1 is a flow diagram of the steps in controllably altering the temperature dependence of a glass waveguide device in accordance with the invention.

Referring to the drawings, FIG. 1 is a block diagram of the steps involved in enhancing the thermal stability of a waveguide device. The first step, as illustrated in block A, is to provide a glass waveguide device to be improved. The waveguide device can be either a planar waveguide device, a fiber waveguide device or a combination of the two. Exemplary devices include routers, Fourier filters and Bragg gratings.

Figure 2A:
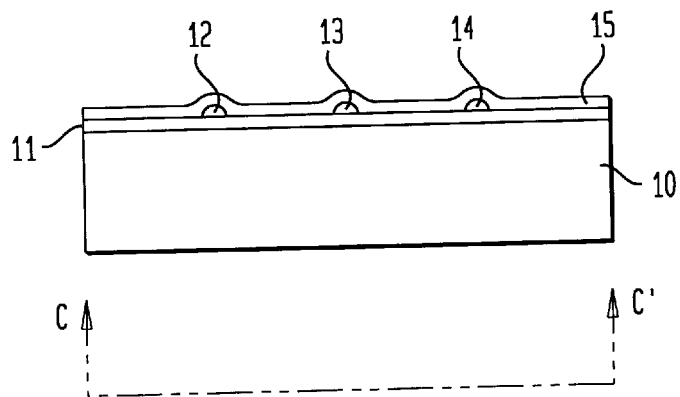
FIGS. 2A, 2B and 2C illustrate a waveguide device at various stages of the FIG. 1 process.

FIG. 2A is a cross sectional view of an exemplary waveguide device (here a planar device) comprising a substrate 10, such as silicon, a base layer 11, such as undoped silica, one or more waveguide defined by one or more cores 12, 13, 14 and a cladding 15. The cores can be P-doped or Ge-doped silica having a refractive index increased by a percentage (typically $\Delta=0.60-0.70\%$) as compared with the base. The cladding can be doped with boron and phosphorus to achieve both a lowered flow temperature and an index preferably equal to the base layer.

Figure 2B:
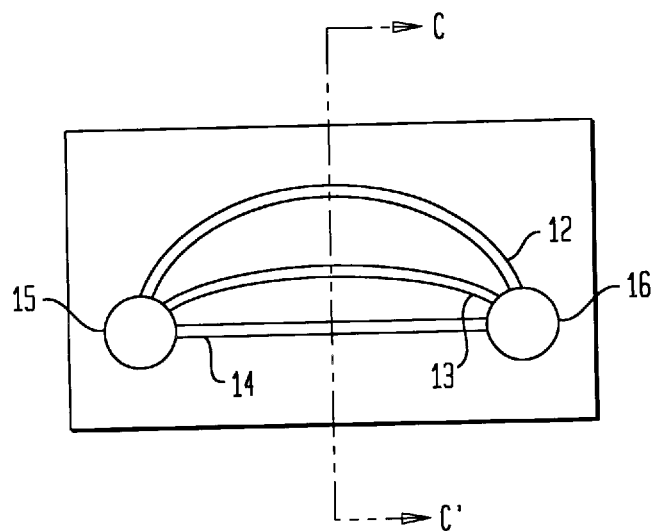

FIG. 2B is a plan view of the device of FIG. 2A. The cores 12, 13, 14 define optical waveguides of different lengths that extend between a common input 15 and a common output 16. Variations in temperature will produce different absolute thermal pathlength changes in the two waveguides. The methods for fabricating such waveguides are well known in the art and are described in further detail in C. H. Henry et al. "Glass Waveguides on Silicon for Hybrid Optical Packaging, *J. Lightwave Technol.*, 1539 (1989).

The next step, which is optional in some applications, is to mask the waveguide, leaving exposed those regions where the refractive index variation with temperature (dn/dT) is to be altered. Where dn/dT is to be altered for the full length of the waveguide, masking is not required. But in applications where it is desired to equalize the effect of temperature variation among plural waveguides, different length waveguides will generally require masking to provide exposed regions of different length. The masking material should be impermeable to the treatment material. Silicon nitride films having a thickness on the order of 1 μm is preferred for masking devices to be treated with $D_2O$. Such films can be deposited by plasma CVD.

The third step (FIG. 1, block C) is to incorporate into the exposed regions of the waveguides a thermal compensating material which is transparent to the operating wavelength and which has a dn/dT different from that of the waveguide material. Typical waveguide glasses have a positive dn/dT, so the material incorporated into glass should have a negative dn/dT or a positive dn/dT substantially different from that of glass. Suitable negative dn/dT compensating materials include $D_2O$, ethanol and methanol. The amount of material should exceed 1 weight percent of the glass and preferably should exceed 10%. $D_2O$ is preferred for glass communications devices operating at 1.55 μm.

Figure 2C:
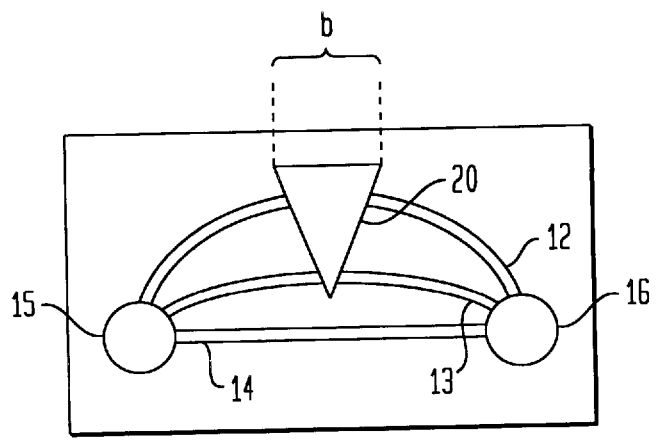

$D_2O$ can be incorporated in glass by exposing the glass to $D_2O$ steam at elevated temperature (100–300° C.) and pressure (15–1500 psi) for a period typically 1–20 hr. FIG. 2C shows the device of FIG. 2B after treatment with $D_2O$ in an exposed region such as triangle 20. Waveguide 12 is not exposed. Longer waveguide 13 is exposed over a first length, and the longest waveguide 14 is exposed over a second length longer than the first. The resulting device has enhanced temperature stability. Specifically, the constitutive waveguides are processed so that their optical pathlengths are affected equally by changes in temperature. Alternatively if a compensating material having a positive dn/dT greater than glass were used, then the shorter waveguides would be treated over longer lengths to achieve compensation.

The final steps, which are optional, are to remove the mask (block D) and to seal the incorporated material into the glass (block E). Sealing can be done by applying a thin coating of metal such as a few hundred nanometers of chromium or gold over the treated region 20.

Figure 3A:
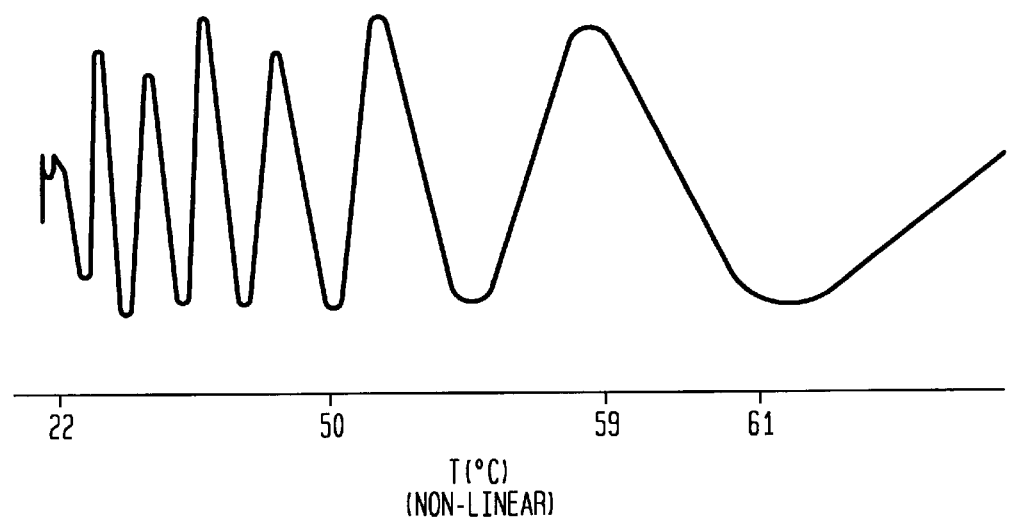
FIGS. 3A and 3B are graphical illustrations comparing the thermal stability of a waveguide processed in accordance with FIG. 1 to that of an unprocessed waveguide.
Figure 3B:
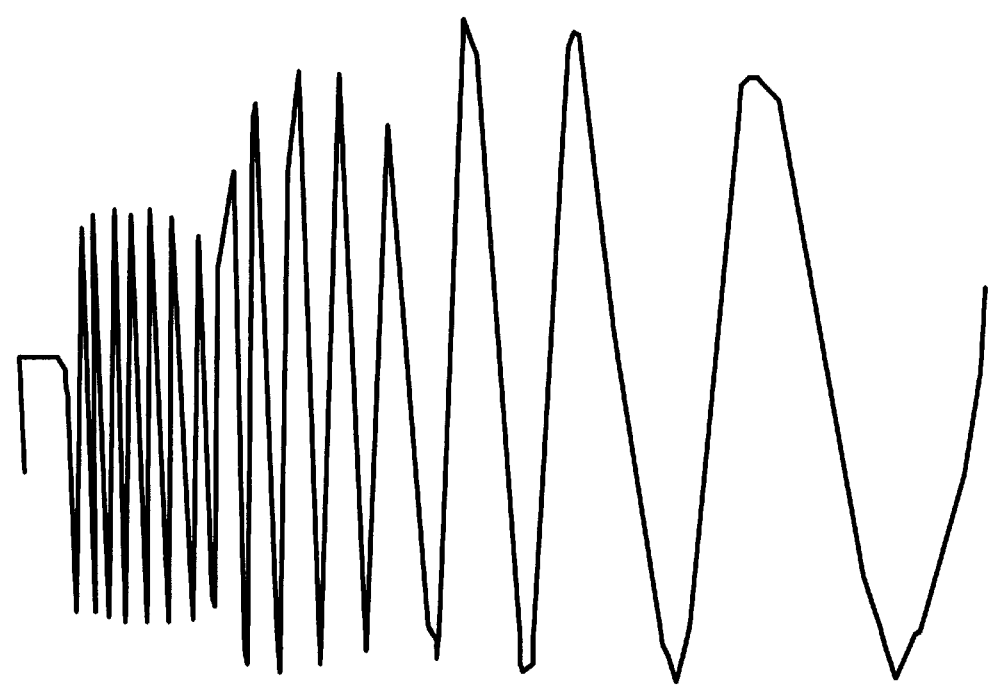

The degree of temperature compensation which can be achieved by this process is demonstrated by the following specific example. Sample 1 is a 2 cm length planar waveguide treated with $D_2O$ at 300° C. for 15 hrs. Sample 2 is a 2 cm length of similar, untreated planar waveguide. 1.5 micrometer laser light was launched into each of the two samples and the temperature was raised approximately 40° C. from room temperature to about 62° C. The interference between the front (entrance face) and back (exit face) reflections were monitored. FIG. 3A shows the interference fringes plotted against temperature for the treated sample and FIG. 3B shows the infringes for the untreated sample. As can be seen, the treated sample has fewer fringes corresponding to a lower magnitude dn/dT. Specifically, the magnitude of dn/dT for the treated sample is 9/16 that of the untreated sample for an enhancement factor e≈0.56 (56%). The length l of treated region required to compensate two waveguides of unequal length $l_1, l_2$ can readily be calculated from the difference in length $\Delta l=|l_1-l_2|$ and the enhancement factor e by the relation $l=\Delta l/e$. So, for example, if $\Delta l$ is 0.25 mm and e=0.5, then l is 0.5 mm.

Device Applications

The process of FIG. 1 permits the fabrication of a wide variety of glass waveguide devices with enhanced temperature stability. In general, the device is fabricated in the usual fashion, and the process of FIG. 1 is then applied after fabrication to alter the temperature coefficient of refractive index for one or more of the glass waveguides. In multiwaveguide devices, this alteration can be applied in a spatially selective manner to equalize the temperature effects on different waveguides and thereby making the overall device temperature insensitive. In single waveguide devices the reduction in temperature sensitivity is proportional to minimization of dn/dT. Three important device applications will be illustrated: 1) temperature compensation of a multiwaveguide router, 2) temperature compensation of a multiwaveguide filter, and 3) reduction in temperature dependence of a single waveguide Bragg grating.

A. Temperature Compensation of a Multiwaveguide Router

Figure 4:
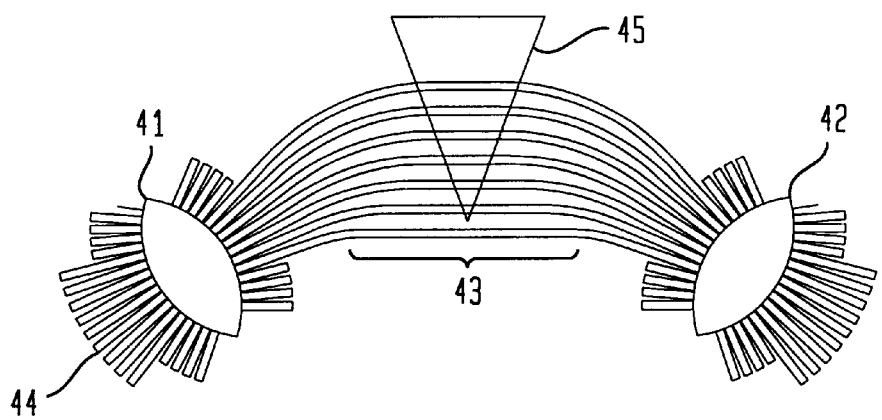
FIG. 4 shows a waveguide router device having enhanced thermal stability.

FIG. 4 schematically illustrates an improved form of a device known as a waveguide grating router. The conventional portion of the device 40 comprises a pair of star couplers 41, 42 connected by an array 43 of waveguides that act like a grating, specifically there is a constant pathlength difference between adjacent waveguides in the array. The two star couplers 41, 42 are mirror images, except the number of inputs and outputs can be different.

In conventional operation, the lightwave from an input waveguide 44 couples into the waveguide grating array 43 by input star coupler 41. If there were no differential phase shift in the grating region, the lightwave propagation to the output coupler 42 would appear as if it were the reciprocal propagation in the input coupler. The input waveguide would thus be imaged at the interface between the output coupler and the output waveguides. The imaged input waveguide would be coupled to one of the output waveguides. But the linear length difference in the grating array results in a wavelength-dependent tilt of the wavefront in the grating waveguides and thus shifts the input waveguide image to a wavelength-dependent position. As the wavelength changes, the input waveguide image sweeps across and couples light onto different output waveguides. The structure and operation of the conventional device is described in greater detail in U.S. Pat. No. 5,467,418 issued to C. Dragone on Nov. 14, 1995 which is incorporated herein by reference.

In accordance with the invention, the temperature stability of the device is enhanced by introducing a region of altered dn/dT in the waveguide grating to compensate the thermal response of the constituent waveguides. This may be conveniently accomplished using the process of FIG. 1 by introducing $D_2O$ into a triangular region 45 of the array. The base b of the triangle is located so that the longer waveguides have longer treated segments in the triangular region. Assuming the 9/16 reduction of FIGS. 3A, a triangle for a typical grating array would have a base on the order of 1 cm. If, instead of using a negative dn/dT compensating material, one used a compensating material having a positive dn/dT substantially greater than glass, then compensation could be achieved by inverting the triangular region 45 so that the shortest waveguide was treated over the longest region.

B. Temperature Compensated Multiwaveguide Filters

Figure 5:
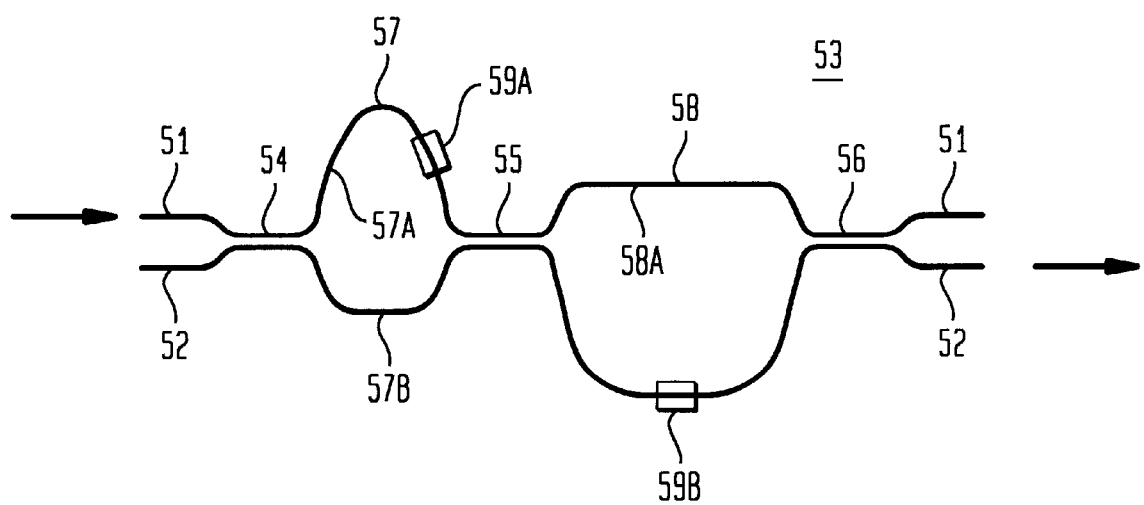
FIG. 5 illustrates a waveguide Fourier filter having enhanced thermal stability.

FIG. 5 is a schematic top view of a simple form of a monolithic optical waveguide filter 10 known as a Fourier filter. The conventional Fourier filter comprises a pair of optical waveguides 51 and 52 on a substrate 53 configured to form a plurality N of optical couplers 54, 55 and 56 alternately connected by a plurality of N−1 delay paths 57 and 58. Each coupler is comprised of a region of close adjacency of the two waveguides where the exponential tail of light transmitted on each of waveguides 51 and 52 interacts with the other, coupling light from one waveguide to the other. The amount of power coupled from one waveguide to the other is characterized by the effective length of the coupler.

Each delay path comprises a pair of waveguide segments between two couplers, for example segments 57A and 57B between couplers 54 and 55. The segments are configured to provide unequal optical path lengths between the two couplers, thereby providing a differential delay.

In operation, an optical input signal is presented at an input coupler, e.g. along waveguide 51 at coupler 54, and a filtered output is presented at an output coupler, e.g. along waveguide 52 at coupler 56. The sequence of couplers and delays provide light at the input with a plurality of paths to the output. In general there will be $2^{N-1}$ paths where N is the number of couplers.

Each of the optical paths of the filter provide light corresponding to a harmonic component in a Fourier series whose summation constitutes the transmission function of the filter. By proper choice of parameters one can closely approximate a desired transmission function. The structure and fabrication of such filters is described in further detail in U.S. Pat. No. 5,596,661 issued to C. H. Henry et al. on Jan. 21, 1997 which is incorporated herein by reference.

As can readily be seen, the proper operation of the Fourier filter depends upon precise control of the differential delay between coupled waveguides. Variation of this differential delay due to different effects of temperature change adversely affects performance of the filter.

In accordance with the invention, this device can be temperature compensated by forming one or more regions 59A, 59B of altered dn/dT in accordance with the method of FIG. 1. Preferably the regions 59A, 59B are formed in the longer waveguides e.g. 57B and 58B. Assuming the level of alteration shown in FIG. 3A, compensation for typical Fourier filters could be achieved in rectangular regions having lengths of approximately twice the pathlength difference.

C. Bragg Gratings With Reduced Temperature Sensitivity

Figure 6:
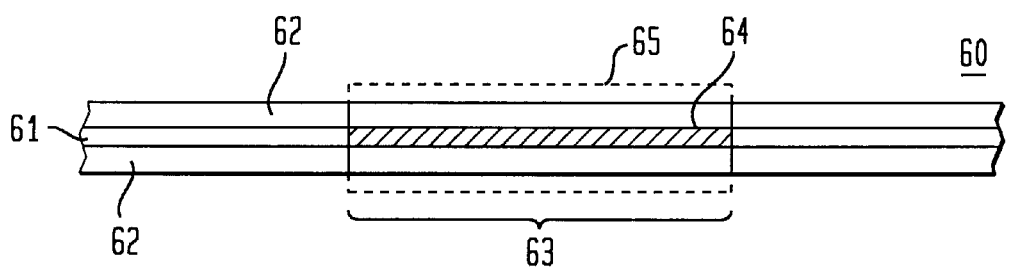
FIG. 6 shows a waveguide Bragg filter having enhanced thermal stability.

FIG. 6 is a schematic cross section of an optical waveguide Bragg grating device comprising a length of optical waveguide 60 (here optical fiber) having a core 61, a cladding 62, and a Bragg grating 63 comprising a plurality of index perturbations 64 in the core index substantially equally spaced along the waveguide. These perturbations selectively reflect light of the wavelength λ equal to twice the spacing Λ between successive perturbations, i.e. λ=2Λ. The remaining wavelengths pass essentially unimpeded. Such Bragg gratings have found use in a variety of applications including filtering, stabilization of semiconductor lasers, reflection of fiber amplifier pump energy and compensation for fiber dispersion. The temperature sensitivity of the Bragg resonance depends in important part on dn/dT of the waveguide in which it is written. In accordance with the invention, the temperature stability is enhanced by reducing the thermal sensitivity of the waveguide in accordance with the method of FIG. 1. Here optional masking could selectively expose a waveguide portion 65 where the grating is written. In the case of fiber waveguides, which often use pure silica cladding, it may be necessary to use a different cladding, such as P, B doped silica, to permit introduction of $D_2O$. No change in typical cladding composition is needed for Bragg gratings in planar waveguide Bragg gratings.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. In the method of making an optical waveguide device comprising the steps forming at least one glass optical waveguide comprising a core and a cladding, said waveguide having an effective index which varies with temperature, the improvement comprising masking said optical waveguide device to selectively expose a region including a length of said glass optical waveguide to be temperature compensated, and incorporating into said length of glass optical waveguide at least 1% by weight of a compensating material having refractive index which varies with temperature in a manner different from said waveguide thereby producing a waveguide device having enhanced thermal stability.

2. The method of claim 1 wherein said compensating material has a refractive index which varies with temperature in the opposite polarity as compared with said waveguide.

3. The improved method of claim 1 comprising incorporating at least 10% by weight of said compensating material.

4. The improved method of claim 1 wherein said compensating material is $D_2O$.

5. The improved method of claim 1 wherein said compensating material is incorporated into said region by exposing said device to $D_2O$ steam.

6. The improved method of claim 1 wherein said compensating material is $D_2O$ and it is incorporated in said region by exposing said region to $D_2O$ steam at a temperature in the range 100–300° C. at a pressure in the range 15 to 1500 psi for a period in the range 1–20 hr.

7. In the method of making an optical waveguide device comprising the steps of forming at least one glass optical waveguide comprising a core and a cladding, said waveguide having an effective index which varies with temperatures, the improvement comprising incorporating into a length of said glass optical waveguide at least 1% by weight of a compensating material having a refractive index which varies with temperature in a manner different from said waveguide, thereby producing a waveguide device having enhanced thermal stability and sealing said compensating material along a region of said length by applying a coating of metal over said region.

8. The method of claim 7 wherein said compensating material has a refractive index which varies with temperature in the opposite polarity as compared with said waveguide.

9. The improved method of claim 7 comprising incorporating at least 10% by weight of said compensating material.

10. The improved method of claim 7 wherein said compensating material is $D_2O$.

11. The improved method of claim 7 wherein said compensating material is incorporated into said region by exposing said device to $D_2O$ steam.

12. The improved method of claim 7 wherein said compensating material is $D_2O$ and it is incorporated in said waveguide by exposing said waveguide to $D_2O$ steam at a temperature in the range 100–300°C. at a pressure in the range 15 to 1500 psi for a period in the range 1–20 hr.

* * * * *